United States Patent [19]
Furukawa et al.

[11] Patent Number: 5,834,614
[45] Date of Patent: Nov. 10, 1998

[54] METHOD FOR PRODUCING A FLUORINE-CONTAINING SILICONE COMPOUND

[75] Inventors: Yutaka Furukawa; Mami Kotera, both of Yokohama; Seisaku Kumai, Fujisawa, all of Japan; Gerald J. Murphy, Hopewell Junction, N.Y.

[73] Assignees: Asahi Glass Company Ltd., Tokyo, Japan; OSi Specialties Incorporated, Greenwich, Conn.

[21] Appl. No.: 847,454

[22] Filed: Apr. 23, 1997

[30] Foreign Application Priority Data

Apr. 23, 1996 [JP] Japan .................................. 8-101609

[51] Int. Cl.$^6$ ....................................................... C07F 7/08
[52] U.S. Cl. ............................................................ 556/479
[58] Field of Search ................................................ 556/479

[56] References Cited

U.S. PATENT DOCUMENTS

| | | | |
|---|---|---|---|
| 5,550,272 | 8/1996 | Lewis et al. | 556/479 |
| 5,639,845 | 6/1997 | Inomata et al. | 556/479 X |
| 5,661,202 | 8/1997 | Akamatsu et al. | 556/479 X |
| 5,663,399 | 9/1997 | Furukawa et al. | 556/479 |

FOREIGN PATENT DOCUMENTS 7-53719  2/1995  Japan .

*Primary Examiner*—Paul F. Shaver
*Attorney, Agent, or Firm*—Oblon, Spivak, McClelland, Maier & Neustadt, P.C.

[57] ABSTRACT

A method for producing a fluorine-containing silicone compound, which comprises subjecting a fluorine-containing unsaturated compound of the following formula (1) and a hydrosilicone compound having at least one hydrogen atom bonded to a silicon atom to hydrosilylation in the presence of a catalyst to obtain a fluorine-containing silicone compound having a $R^f$—Q—$CR^1R^2$—$CHR^3$—$CR^4R^5$— group bonded to the silicon atom:

$$R^f\text{—Q—}CR^1R^2\text{—}CR^3\text{=}CR^4R^5 \qquad (1)$$

wherein $R^f$ is a monovalent fluorine-containing organic group, Q is a single bond or a bivalent organic group, and each of $R^1$ to $R^5$ which are independent of one another, is a hydrogen atom or a monovalent organic group, wherein the hydrosilylation is carried out substantially in the absence of a solvent.

18 Claims, No Drawings

METHOD FOR PRODUCING A FLUORINE-CONTAINING SILICONE COMPOUND

BACKGROUND OF THE INVENTION

1. Field of the Invention

The present invention relates to an improved method for producing a fluorine-containing silicone compound. The fluorine-containing silicone compound in the present invention is a compound useful for industrial base materials or their starting materials, particularly useful for various industrial base materials which are required to have excellent water repellency, oil repellency, stain-proofing properties, release properties or other properties, or their starting materials.

2. Discussion of Background

A method is known wherein a fluorine-containing unsaturated compound having at least one hydrocarbon group between a double bond and a fluoroalkyl group, as represented by $R^fCH_2CH=CH_2$, is reacted with a hydrosilicone having at least one hydrogen atom bonded to a silicon atom, in the presence of a catalyst, to obtain a silicone oil having a $R^fCH_2CH_2CH_2$— group bonded to the silicon atom (JP-A-7-53719).

The conventional reaction has been carried out usually in the presence of a solvent such as toluene or 1,3-bis(trifluoromethyl)benzene. However, there has been a problem that the addition reaction tends to be slow when a solvent is used. Further, if a catalyst is added to accelerate the reaction, there has been a problem that the product tends to be colored. Further, addition of the catalyst has brought about an additional problem that the time and energy are required for the removal of the catalyst, which adds to the cost of the product.

Further, if active carbon is used to remove the catalyst, the amount of active carbon required increases as the amount of the catalyst increases, while there has been a problem that the yield of the product decreases. Further, the obtained silicone oil having a $R^fCH_2CH_2CH_2$— group tends to have a high viscosity, whereby it is difficult to completely remove the solvent by a usual method.

In a case where the silicone oil obtained by the reaction in the presence of a solvent is used as it is without removal of the solvent, there has been a problem that when the silicone oil is heated, the remaining solvent undergoes evaporation. Especially when such an oil is used as a stain-proofing agent for a heat-fixing roll of a printer, the evaporated solvent not only causes a problem of odor but also brings about a problem that it deteriorates a silicone resin or the like used for the surface of the copying roll.

SUMMARY OF THE INVENTION

The present invention has been made to solve the above problems and is characterized by carrying out the reaction in the absence of a solvent.

Namely, the present invention presents a method for producing a fluorine-containing silicone compound, which comprises subjecting a fluorine-containing unsaturated compound of the following formula (1) and a hydrosilicone compound having at least one hydrogen atom bonded to a silicon atom to hydrosilylation in the presence of a catalyst to obtain a fluorine-containing silicone compound having a $R^f$—Q—$CR^1R^2$—$CHR^3$—$CR^4R^5$— group bonded to the silicon atom:

$$R^f\text{—Q—}CR^1R^2\text{—}CR^3\text{=}CR^4R^5 \quad (1)$$

wherein $R^f$ is a monovalent fluorine-containing organic group, Q is a single bond or a bivalent organic group, and each of $R^1$ to $R^5$ which are independent of one another, is a hydrogen atom or a monovalent organic group, wherein the hydrosilylation is carried out substantially in the absence of a solvent.

DETAILED DESCRIPTION OF THE PREFERRED EMBODIMENTS

In the present invention, an "organic group" means a group containing carbon atoms and is preferably a hydrocarbon group with respect to either a monovalent organic group or a bivalent organic group, unless otherwise specified. In the following description, an "organic group" generally refers to a monovalent organic group and a bivalent organic group. The same applies to other groups. The "hydrocarbon group" is an organic group comprising carbon atoms and hydrogen atoms. However, the hydrocarbon group in the present invention may contain an oxygen atom or a sulfur atom. The hydrocarbon group may be either an aromatic hydrocarbon group or an aliphatic hydrocarbon group, but is preferably an aliphatic hydrocarbon group. As a monovalent hydrocarbon group, an alkyl group is preferred, and as a bivalent hydrocarbon group, an alkylene group is preferred. Further, the hydrocarbon group may be a group having at least one carbon atom substituted by an ether type oxygen atom or a thioether type sulfur atom.

In the present invention, a "fluorine-containing organic group" means an organic group having at least one fluorine atom, among the above mentioned organic groups. The fluorine-containing organic group is preferably a "fluorine-containing hydrocarbon group" which is a group having at least one hydrogen atom of a hydrocarbon group substituted by a fluorine atom.

The fluorine-containing hydrocarbon group may be either a "fluorine-containing aromatic hydrocarbon group" having at least one hydrogen atom of an aromatic hydrocarbon group substituted by a fluorine atom, or a "fluorine-containing aliphatic hydrocarbon group" having at least one hydrogen atom of an aliphatic hydrocarbon group substituted by a fluorine atom, but is preferably a fluorine-containing aliphatic hydrocarbon group. The carbon number of the fluorine-containing aliphatic hydrocarbon group is preferably from 1 to 18, more preferably from 1 to 12. The carbon number of the fluorine-containing aromatic hydrocarbon group is preferably from 6 to 12, more preferably from 6 to 8.

Further, the fluorine-containing hydrocarbon group may have an ether type oxygen atom (—O—) or a thioether type sulfur atom (—S—) introduced between carbon atoms of a carbon-carbon bond of the above-mentioned fluorine-containing aliphatic hydrocarbon group.

When $R^f$ is a monovalent fluorine-containing aliphatic hydrocarbon group, it is preferably a "fluorine-containing alkyl group" having at least one hydrogen atom of an alkyl group substituted by a fluorine atom, more preferably a "polyfluoroalkyl group" having at least two hydrogen atoms of an alkyl group substituted by fluorine atoms. In the following description, a polyfluoroalkyl group will be represented by a "$R^F$ group".

The fluorine-containing unsaturated compound in the present invention is a compound of the formula (1). $R^f$ in the formula (1) is a monovalent fluorine-containing organic group. The carbon number of $R^f$ is preferably from 1 to 18, more preferably from 1 to 12, most preferably from 6 to 12. Further, $R^f$ may have at least one carbon atom of the alkyl group substituted by an ether type oxygen atom or a thioether type sulfur atom, or —NH— may be inserted between carbon atoms of a carbon-carbon bond. $R^f$ is preferably a group having a fluorine atom bonded to the terminal carbon atom bonded to Q.

When $R^f$ is a $R^F$ group, the proportion of fluorine atoms in the $R^F$ group, i.e. (number of fluorine atoms in the $R^F$ group)/(number of hydrogen atoms in an alkyl group having the same carbon number as the $R^F$ group)×100 (%), is preferably at least 60%, more preferably at least 80%, most preferably substantially 100%. In the following description, the $R^F$ group having substantially all of the hydrogen atoms in the alkyl group substituted by fluorine atoms, may be referred to also as a perfluoroalkyl group.

The $R^F$ group may have either a straight-chain structure or a branched chain structure, but a straight-chain structure is preferred. When it has a branched chain structure, the branched portion is preferably a short chain having a carbon number of from 1 to 3. Further, the $R^F$ group may contain two or more groups having different carbon numbers.

When $R^f$ is a monovalent fluorine-containing aromatic hydrocarbon group, it is preferably a group having at least one hydrogen atom in a phenyl group, a benzyl group or such a group having a lower alkyl group substituted thereon, substituted by a fluorine atom.

$R^f$ in the formula (1) is preferably a perfluoroalkyl group, particularly preferably a straight-chain perfluoroalkyl group of the formula $CF_3(CF_2)k$—, wherein k is an integer of from 1 to 18, preferably from 2 to 16, more preferably 4 to 13.

Specific examples of $R^f$ will be given below, but $R^f$ is not limited to such examples. The following examples include structure-isomeric groups which are represented by the same molecular formula but have different structures.

$CF_3(CF_2)$—, $C_3F_7$— [including both $CF_3(CF_2)_2$— and $(CF_3)_2CF$—], $C_4F_9$— [including $CF_3(CF_2)_3$—, $(CF_3)_2CFCF_2$—, $(CF_3)_3C$— and $CF_3CF_2CF(CF_3)$—], $C_5F_{11}$— [including structure-isomeric groups such as $CF_3(CF_2)_4$—, $(CF_3)_2CF(CF_2)_2$—, $(CF_3)_3CCF_2$— and $CF_3CF_2CF(CF_3)CF_2$—], $C_6F_{13}$— [including structure-isomeric groups such as $CF_3(CF_2)_2C(CF_3)_2$—], $C_8F_{17}$—, $C_{10}F_{21}$—, $C_{12}F_{25}$—, $C_{15}F_{31}$—, $HC_tF_{2t}$— (wherein t is an integer of from 1 to 18), $(CF_3)_2CFC_sF_{2s}$— (wherein s is an integer of from 1 to 15).

$CF_3(CF_2)_4OCF(CF_3)$—, $F[CF(CF_3)CF_2O]_uCF(CF_3)CF_2CF_2$—, $F[CF(CF_3)CF_2O]_uCF(CF_3)$—, $F(CF_2CF_2CF_2O)_vCF_2CF_2$— or $F(CF_2CF_2O)_wCF_2CF_2$— (wherein u is an integer of from 1 to 10, v is an integer of from 1 to 11, and w is an integer of from 1 to 11), $C_6F_5$—, $C_6F_5CF=CF$— and $CH_2=CHC_6F_{12}$—.

In the formula (1), Q is a single bond or a bivalent organic group, preferably a single bond. When Q is a single bond, it means that $R^f$ is directly bonded with $CR^1R^2$.

When Q is a bivalent organic group, it is preferably a $C_{1-8}$ bivalent hydrocarbon group or a bivalent hydrocarbon group containing a heteroatom. Q is preferably a $C_{1-8}$ alkylene group, particularly preferably a $C_{1-5}$ alkylene group. The alkylene group may be either a linear alkylene group or a branched alkylene group, preferably a linear alkylene group. When it has a branched portion, such a branched portion is a preferably a short chain having a carbon number of from 1 to 3. When Q is a bivalent hydrocarbon group containing a heteroatom, it is preferably a bivalent hydrocarbon group containing an ether type oxygen atom or a thioether type sulfur atom, such as —$(CH_2)_2O(CH_2)_3$—, —$CH_2O(CH_2)_3$— or —$(CH_2)_2S(CH_2)_3$—.

In the formula (1), each of $R^1$ to $R^5$ which are independent of one another, is a hydrogen atom or a monovalent organic group. From the viewpoint of the reactivity with the hydrosilicone, it is preferred that any one of them is a hydrogen atom. Particularly preferably, all of them are hydrogen atoms. Namely, the compound of the formula (1) is preferably a compound represented by the formula (1A), particularly a compound of the formula (1B) which corresponds to a compound of the formula (1A) wherein Q is a single bond.

(1A)

(1B)

When any one of $R^1$ to $R^5$ in the formula (1) is a monovalent organic group, it is preferably a monovalent hydrocarbon group. Each of $R^1$ to $R^5$ is preferably a sterically small group such as a methyl group or an ethyl group, since if it is a sterically bulky group, the reactivity tends to be poor.

In the present invention, the fluorine-containing unsaturated compound of the formula (1) may be a mixture of two or more compounds wherein the structure of $R^f$ is different. When it is a mixture, it is preferably a mixture of two or more compounds having $R^f$ groups having different carbon numbers.

As the fluorine-containing unsaturated compound of the formula (1), the following examples may be given, but it is not limited to such specific examples.

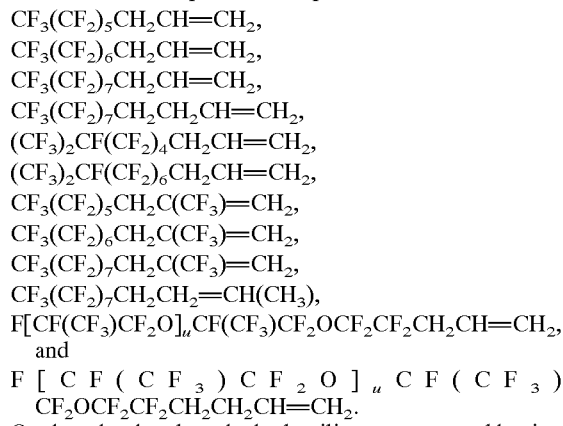

On the other hand, as the hydrosilicone compound having at least one hydrogen atom directly bonded to a silicon atom, to be used in the present invention, a known or well known compound having at least one Si—H in a molecule of a silicone compound can be used. Such a hydrosilicone compound is preferably a silicone compound having hydrosiloxane units such as $R^aHSiO_{2/2}$ units, $(R^b)_2HSiO_{1/2}$ units or $HSiO_{3/2}$ units. Here, each of $R^a$ and $R^b$ is a monovalent hydrocarbon group, preferably a $C_{1-3}$ alkyl group, $C_6H_5$— or $C_6H_5CH_2CH_2$—, particularly preferably a methyl group.

When the hydrosilicone compound contains siloxane units other than hydrosiloxane units, such units are preferably $(R^c)_3SiO_{1/2}$ units, $(R^d)_2SiO_{2/2}$ units or $R^eSiO_{3/2}$ units. Here, each of $R^c$ to $R^e$ is a monovalent hydrocarbon group, preferably a $C_{1-3}$ alkyl group, $C_6H_5$— or $C_6H_5CH_2CH_2$—, particularly preferably a methyl group.

The hydrosilicone compound may have either a cyclic, linear (straight-chain or branched chain) or resin-like structure, preferably a cyclic or linear structure, more preferably a linear structure.

In the present invention, the hydrosilicone compound is preferably a hydrosilicone compound represented by the average compositional formula (2):

(2)

wherein a is an integer of 0 or less than 4, b is an integer of less than 4, provided that $0 < a+b \leq 4$, and $R^6$ is a monovalent organic group.

$R^6$ is preferably a monovalent hydrocarbon group, more preferably a $C_{1-3}$ alkyl group, $C_6H_5$— or $C_6H_5CH_2CH_2$—, most preferably a methyl group.

The hydrosilicone compound of the average compositional formula (2) may, for example, be a hydrosilicone compound of the formula (3), or a hydrosilicone compound such as $H(CH_3)_3Si$ or $H(CH_3)_2SiO$—$(CH_2)_p$—$Si(CH_3)_2H$ (wherein p is an integer of at least 1), preferably the compound of the formula (3).

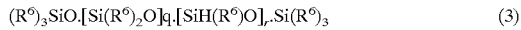

$(R^6)_3SiO.[Si(R^6)_2O]_q.[SiH(R^6)O]_r.Si(R^6)_3$      (3)

In the formula (3), $R^6$ is as defined above, preferably a methyl group, q is an integer of 0 or more, and r is an integer of 1 or more. The structure of the compound of the formula (3) may have either a structure of a block polymer wherein siloxane units of the same structure are arranged in a block state or a structure of a random polymer wherein siloxane units of the same structure are randomly arranged. The same applies to the description of the following polysiloxane.

In the present invention, the fluorine-containing unsaturated compound of the formula (1) is reacted with the hydrosilicone compound having at least one hydrogen atom directly bonded to a silicon atom.

In the reaction of the compound of the formula (1) with the hydrosilicone compound of the present invention (hereinafter referred to as hydrosilylation), addition to $R^f$—Q—$CR^1R^2$—$CR^3$=$CR^2R^3$ of a hydrogen atom directly bonded to the silicon atom, takes place to form a fluorine-containing silicone compound having a $R^f$—Q—$CR^1R^2$—$CHR^3$—$CR^2R^3$— group directly bonded to the silicon atom.

The fluorine-containing silicone compound is preferably a compound represented by the average compositional formula (4):

$(R^f$—Q—$CR^1R^2$—$CHR^3$—$CR^4R^5$ $)_b(R^6)_aSiO_{(4-a-b)/2}$      (4)

wherein $R^f$, Q, $R^1$ to $R^6$, a and b are as defined above.

In the hydrosilylation of the fluorine-containing unsaturated compound of the formula (1) with the hydrosilicone compound, it is important that the compound of the formula (1) is a compound having a connecting group (—Q—$CR^1R^2$—) between a $R^f$ group and an unsaturated group (—$CR^3$=$CR^4R^5$). If it is a compound having no such a connecting group, e.g. a compound of the formula $C_8F_{17}CH$=$CH_2$, the addition reaction to the hydrosilicone compound tends to hardly proceed. However, as in the present invention, when a compound having such a connecting group is employed, the hydrosilylation proceeds in good yield, and the reaction can be proceeded without any solvent.

The reaction of the compound of the formula (1) with the above hydrosilicone compound is carried out in the presence of a catalyst. As the catalyst, a catalyst containing a transition metal is preferred. Particularly preferred is a catalyst containing platinum, rhodium or cobalt. Usually, the reaction temperature is preferably from 0° to 100° C. The reaction time may be suitably changed depending upon the compound used, but it is usually from 0.5 to 10 hours. However, the reaction may proceed even in a short time. Therefore, it is preferably from 0.5 to 5 hours. The amount of the catalyst is usually from 1 to 100 ppm in the reaction system. However, in the present invention, even when the amount of the catalyst is reduced, the reaction may proceed in a short time. Accordingly, it is preferably from 0.01 to 10 ppm.

The present invention is characterized in that the reaction of the compound of the formula (1) with the hydrosilicone compound is carried out substantially in the absence of a solvent. The amount of a solvent contained in the reaction system is preferably 0 (no solvent). However, a small amount of the solvent which is used for the preparation of a reagent to be used for the reaction, for example, a very small amount of a solvent required to dissolve the catalyst, may be present without any problem. In a usual case, the amount of the solvent is preferably not higher than 1 wt %, more preferably from 0 to 0.1 wt %, in the reaction system. In the reaction of the compound of the formula (1) with the hydrosilicone compound, an addition reaction (hydrosilylation) of the compound of the formula (1) to the hydrogen atom bonded to the silicon atom proceeds to form a fluorine-containing silicone compound having a $R^f$—Q—$CR^1R^2$—$CHR^3$—$CR^4R^5$— group bonded to the silicon atom. In the following description, a silicone compound having a $R^f$—Q—$CR^1R^2$—$CHR^3$—$CR^4R^5$— group bonded to the silicon atom is generally referred to as a "fluorine-containing silicone compound". As the fluorine-containing silicone compound, a fluorine-containing silicone compound of the formula (5) is preferred which is a product obtained by hydrosilylation of a fluorine-containing unsaturated compound to all of Si—H of the hydrosilicone compound of the formula (3). In the formula (5), $R^f$, $R^1$ to $R^6$, Q, q and r are as defined above.

$(R^6)_3SiO.[Si(R^6)_2O]_q.[Si(CR^5R^4CHR^3CR^2R^1QR^f)(R^6)O]_r.Si(R^6)_3$      (5)

Further, the fluorine-containing silicone compound is preferably a fluorine-containing silicone compound of the formula (6) which is a product obtained by hydrosilylation of a fluorine-containing unsaturated compound of the formula (1A) to all of Si—H of the hydrosilicone compound of the formula (3). In the formula (6), $R^f$, $R^6$, Q, q and r are as defined above. In the formula (6) $R^6$ is preferably a methyl group and Q is preferably a single bond.

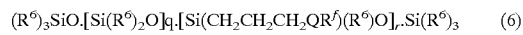

$(R^6)_3SiO.[Si(R^6)_2O]_q.[Si(CH_2CH_2CH_2QR^f)(R^6)O]_r.Si(R^6)_3$      (6)

The amount of the fluorine-containing unsaturated compound in the reaction is preferably at least one equivalent, more preferably from 1.1 to 2 equivalents, per equivalent of the hydrogen atom bonded to the silicon atom in the hydrosilicone compound.

The fluorine-containing silicone compound obtained by the method of the present invention is preferably further reacted with a hydrocarbon compound having a carbon-carbon double bond. Namely, especially when the compound of the formula (1) is a bulky compound, it tends to be difficult to completely diminish H—Si at the end of the hydrosilylation, for example, in a case where the molecular weight of the hydrosilicone compound is high. If H—Si moieties will remain in the product, problematic gelation is likely to occur, which is believed to be caused by coupling of H—Si moieties. This gelation tends to be remarkable especially when the oil is exposed to a high temperature. Therefore, it is likely to be a problem when the obtained fluorine-containing silicone compound is subjected to purification treatment or used under a high temperature condition.

Accordingly, in a case where the obtained fluorine-containing silicone compound (A) substantially has hydrogen atoms bonded to silicone atoms, it is preferred to react the obtained fluorine-containing silicone compound (A) directly or after purification, with a hydrocarbon compound having a carbon-carbon double bond to have the hydrocarbon compound added to substantially all of the hydrogen atoms bonded to silicon atoms. The amount of H—Si in the fluorine-containing silicone compound (A) is preferably at most 1% relative to the unreacted hydrosilicone compound.

The hydrocarbon compound having a carbon-carbon double bond is preferably a compound of the formula $CH_2=CHR^7$, wherein $R^7$ is a hydrogen atom or a $C_{1-6}$ alkyl group. Ethylene is particularly preferred, since it has a very high reactivity and is easy to handle. Ethylene is gaseous under atmospheric pressure at room temperature and thus has an advantage that it can be easily removed from the reaction system after completion of the reaction.

As a method for reacting the hydrocarbon compound having a carbon-carbon double bond, it may be blown into the reaction system after reacting the fluorine-containing unsaturated compound, or the reaction may be carried out under a slightly pressurized condition. The fluorine-containing compound (B) obtainable by reacting the hydrocarbon compound having a carbon-carbon double bond, is preferably a fluorine-containing silicone compound of the following formula (7) which is prepared by reacting a fluorine-containing unsaturated compound of the formula (1) with a hydrosilicone compound of the formula (3), followed by reacting a compound of the formula $CH_2=CHR^7$. In the formula (7), $R^f$, Q, $R^1$ to $R^6$, r and q are as defined above, and s is r>s and an integer of at least 1. In the formula (7), each of $R^1$ to $R^5$ is preferably a hydrogen atom, $R^6$ is preferably a methyl group, and Q is preferably a single bond.

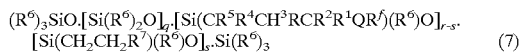
(7)

When the fluorine-containing silicone compound obtainable by the method of the present invention is obtained as an oil, it is useful for various functional oils. For example, such a compound can be used as a stain-proofing agent for a heat-fixing roll, which imparts a stain-proofing property to the surface of a heat-fixing roll of a copying machine or printing machine. The stain-proofing agent for a heat-fixing roll according to the method of the present invention is an excellent stain-proofing agent whereby an adverse effect brought by a residual solvent can be avoided.

When the fluorine-containing silicone compound of the present invention is used as a functional oil, the molecular weight is preferably within a range of from $10^3$ to $10^6$, particularly from $5\times10^3$ to $15\times10^3$.

Further, the number of siloxane units in the fluorine-containing silicone compounds of the above formulae (5) to (7), is usually preferably $5\leq q+r\leq 1400$, more preferably $20\leq q+r\leq 400$. Further, when a function such as water and oil repellency or stain-proofing property attributable to fluorine atoms is desired, the content of fluorine atoms in the fluorine-containing silicone compound is preferably from 15 to 90 wt %, more preferably from 15 to 70 wt %.

In addition to the above-mentioned uses, the fluorine-containing silicone compound of the present invention is useful for various lubricating oils including refrigerator oil, vacuum pump oil or the like, various working oils including transmission oil, brake oil, coupling oil or the like, vibration-deadening oils for automobile or airplane instruments, pickup for player or the like, damping oils for dash pot, shock absorber or the like, lubricating agents, repellents and release agents for heat transfer recorded image-receiving material, magnetic recording medium, magnetic head, impregnated bearing or the like, roll compositions or their surface-coating agents for copying machines, printers or the like, blending agents for shampoo, rinse, or other various make up cosmetic materials, treating agents for various powders, water repellent-oil repellent agents, deep color-processing agents, lubrication-imparting agents for fabrics, insulating oils including transformer oils, condenser oils, cable oils or the like, various additives including leveling agents, anti-blocking agents, irregular color-preventing agents, orange peel-preventing agents or the like for polymer materials including plastics, paints or the like, plasticizers or modifiers for rubber or resins, anti-foaming agents, base oils for grease or compounds, foam stabilizers, blending oils for wax, toner treating agents, oil sealing agents, rust proofing agents, antistatic agents, anti-fogging agents, additives for pharmaceuticals, polishing materials, and the like.

EXAMPLES

Now, the present invention will be described in further detail with reference to Examples. However, it should be understood that the present invention is by no means restricted to such specific Examples.

Example 1

100 g of the compound of the formula (8) and 2 μl of a 1% isopropanol solution of chloroplatinic acid were charged into a 200 cc four-necked flask equipped with a stirrer and a thermometer. After raising the temperature to 80° C., 286 g (1.1 equivalents) of $CF_3(CF_2)_7CH_2CH=CH_2$ was dropwise added thereto. As the reaction proceeded, an increase of the internal temperature by about 10° C. was observed. Upon expiration of 4 hours, disappearance of the H—Si peak at 2150cm$^{-1}$ was confirmed by IR. No substantial coloring was observed in the formed oil. Then, 0.02 g of active carbon was added thereto, and the mixture was stirred at room temperature for one hour and then subjected to filtration to obtain a transparent oil. The yield was 90%. The obtained product was confirmed to have the structure of the formula (9) by NMR and IR.

IR: 1255cm$^{-1}$ (Si—CH$_3$), 1110 to 1000cm$^{-1}$ (Si—O), 1100 to 1340cm$^{-1}$ (C—F).

$^1$HNMR σ (ppm): 0.4–0.7(m, Si—CH$_2$—C), 1.7–2.7(m, Si—C—CH$_2$CH$_2$—).

(8)

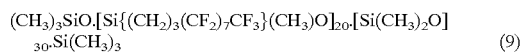
(9)

Comparative Example 1

The reaction was carried out in the same manner as in Example 1 except that the compound of the formula (14) diluted with 100 cc of xylene, was dropwise added. The reaction was carried out for 4 hours, and the peak intensity of H—Si by IR was compared with prior to the reaction and found to be reduced by 40%. Further, 4 μl of the catalyst was added, and the reaction was carried out for 4 hours, whereupon the peak intensity of H—Si was found to be reduced by 80%. Further, 4 μl of the catalyst was added, and the reaction was carried out for 4 hours, whereupon the peak intensity of H—Si was found to be reduced by 98%. The formed oil was colored black. This product was treated with 2 g of active carbon, whereupon the oil was still colored slightly yellow. The yield was 70%.

According to the method of the present invention, a fluorine-containing silicone compound can be obtained in good yield by carrying out the reaction in the absence of a solvent. This production method is a method useful for a reaction on an industrial scale, whereby an environmental problem can also be avoided. Further, the obtained fluorine-containing silicone compound is colorless and transparent, and removal of the catalyst therefrom is easy.

According to the method of the present invention, the reaction proceeds easily in good yield even when the carbon number of the $R^f$ group is large. Further, it has a merit that simply by changing the ratio of the starting materials, fluorine-containing silicone compounds having different structures and functions can be obtained. The obtained fluorine-containing silicone compound is free from a problem of evaporation of a residual solvent even when used under a high temperature condition and can be developed for various applications including an application to a stain-proofing oil for a heat-fixing roll.

What is claimed is:

1. A method for producing a fluorine-containing silicone compound, which comprises subjecting a fluorine-containing unsaturated compound of the following formula (1) and a hydrosilicone compound having at least one hydrogen atom bonded to a silicon atom to hydrosilylation in the presence of a catalyst to obtain a fluorine-containing silicone compound having a $R^f$—Q—$CR^1R^2$—$CHR^3$—$CR^4R^5$— group bonded to the silicon atom:

$$R^f\text{—}Q\text{—}CR^1R^2\text{—}CR^3\text{=}CR^4R^5 \quad (1)$$

wherein $R^f$ is a monovalent fluorine-containing organic group, Q is a single bond or a bivalent organic group, and each of $R^1$ to $R^5$ which are independent of one another, is a hydrogen atom or a monovalent organic group, wherein the hydrosilylation is carried out substantially in the absence of a solvent.

2. The method according to claim 1, wherein Q is a single bond.

3. The method according to claim 1, wherein $R^f$ is a straight-chain perfluoroalkyl group of the formula $CF_3(CF_2)_k$—, wherein k is an integer of from 1 to 18.

4. The method according to claim 1, wherein $R^1$ to $R^5$ are all hydrogen atoms.

5. The method according to claim 1, wherein the fluorine-containing unsaturated compound is $CF_3(CF_2)_kCH_2CH$=$CH_2$, wherein k is an integer of from 1 to 18.

6. The method according to claim 1, wherein the hydrosilicone compound is a compound of the average compositional formula (2):

$$(R^6)_a(H)_bSiO_{(4-a-b)/2} \quad (2)$$

wherein a is an integer of 0 or less than 4, b is an integer of less than 4, provided that $0<a+b\leq 4$, and $R^6$ is a monovalent organic group.

7. The method according to claim 6, wherein $R^6$ is a methyl group.

8. The method according to claim 1, wherein the hydrosilicone compound is a compound of the following formula (3):

$$(R^6)_3SiO.[Si(R^6)_2O]_q.[SiH(R^6)O]_r.Si(R^6)_3 \quad (3)$$

wherein $R^6$ is a monovalent organic group, q is an integer of 0 or more, and r is an integer of 1 or more.

9. The method according to claim 8, wherein $R^6$ is a methyl group.

10. The method according to claim 8, wherein q is an integer of 1 or more.

11. The method according to claim 1, wherein the catalyst is present in an amount of from 0.01 to 10 wt ppm in the reaction system.

12. The method according to claim 8, wherein the fluorine-containing silicone compound is a compound of the following formula (5):

$$(R^6)_3SiO.[Si(R^6)_2O]_q.[Si(CR^5R^4CHR^3CR^2R^1QR^f)(R^6)O]_r.Si(R^6)_3 \quad (5)$$

wherein $R^f$ is a monovalent fluorine-containing organic group, Q is a single bond or a bivalent organic group, each of $R^1$ to $R^5$ which are independent of one another, is a hydrogen atom or a monovalent organic group, $R^6$ is a monovalent organic group, q is an integer of 0 or more, and r is an integer of 1 or more.

13. The method according to claim 8, wherein the fluorine-containing silicone compound is a compound of the following formula (6):

$$(R^6)_3SiO.[Si(R^6)_2O]_q.[Si(CH_2CH_2CH_2QR^f)(R^6)O]_r.Si(R^6)_3 \quad (6)$$

wherein $R^f$ is a monovalent fluorine-containing organic group, Q is a single bond or a bivalent organic group, $R^6$ is a monovalent organic group, q is an integer of 0 or more, and r is an integer of 1 or more.

14. A method for producing a fluorine-containing silicone compound (B), which comprises subjecting a fluorine-containing unsaturated compound of the following formula (1) and a hydrosilicone compound having at least one hydrogen atom bonded to a silicon atom to hydrosilylation in the presence of a catalyst to obtain a fluorine-containing silicone compound (A) having a $R^f$—Q—$CR^1R^2$—$CHR^3$—$CR^4R^5$— group bonded to the silicon atom and having a hydrogen atom bonded to the silicon atom:

$$R^f\text{—}Q\text{—}CR^1R^2\text{—}CR^3\text{=}CR^4R^5 \quad (1)$$

wherein $R^f$ is a monovalent fluorine-containing organic group, Q is a single bond or a bivalent organic group containing no fluorine atom, and each of $R^1$ to $R^5$ which are independent of one another, is a hydrogen atom or a monovalent organic group, wherein the hydrosilylation is carried out substantially in the absence of a solvent, and then reacting the fluorine-containing silicone compound (A) with a compound of the formula $CH_2$=$CHR^7$, wherein $R^7$ is a hydrogen atom or a $C_1$–$C_6$ alkyl group, to obtain a fluorine-containing silicone compound (B) having a $R^f$—Q—$CR^1R^2$—$CHR^3$—$CR^4R^5$— group bonded to the silicon atom and having no hydrogen atom bonded to the silicon atom.

15. The method according to claim 14, wherein the compound of the formula $CH_2$=$CHR^7$ is ethylene.

16. The method according to claim 14, wherein $R^f$ is a straight-chain perfluoroalkyl group of the formula $CF_3(CF_2)_k$—, wherein k is an integer of from 1 to 18.

17. The method according to claim 1, wherein the fluorine-containing silicone compound has a molecular weight of from $10^3$ to $10^6$.

18. The method according to claim 1, wherein the fluorine-containing silicone compound has a fluorine content of from 15 to 90 wt %.

* * * * *